(12) United States Patent
Lee

(10) Patent No.: US 9,244,313 B2
(45) Date of Patent: Jan. 26, 2016

(54) DISPLAY DEVICE

(71) Applicant: LG Display Co., Ltd., Seoul (KR)

(72) Inventor: ChunTak Lee, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/722,437

(22) Filed: May 27, 2015

(65) Prior Publication Data

US 2015/0346534 A1   Dec. 3, 2015

(30) Foreign Application Priority Data

May 28, 2014   (KR) ........................ 10-2014-0064721

(51) Int. Cl.
| | | |
|---|---|---|
| *G02F 1/1339* | (2006.01) | |
| *G02F 1/1368* | (2006.01) | |
| *G02F 1/1337* | (2006.01) | |
| *G02F 1/1333* | (2006.01) | |

(52) U.S. Cl.
CPC .......... *G02F 1/13394* (2013.01); *G02F 1/1337* (2013.01); *G02F 1/1368* (2013.01); *G02F 2001/133354* (2013.01)

(58) Field of Classification Search
CPC . G02F 1/13; G02F 1/13394; G02F 1/136227; G02F 1/1339; G02F 1/1368; G02F 1/133345; G02F 1/134309; G02F 1/136209; G02F 1/136286; G02F 1/1337; G02F 1/1333; G02F 1/1362; G02F 2001/13396; G02F 2201/40; G02F 2201/123; H01L 27/3244; H01L 27/3262; H01L 29/78636

USPC ........... 349/156, 155, 110, 106, 43, 143, 138, 349/139, 158, 187, 123; 257/E21.577, 43, 257/E21.626; 438/637

See application file for complete search history.

(56) References Cited

U.S. PATENT DOCUMENTS 8,081,286 B2 * 12/2011 Kim .................... G02F 1/13394
                                                                349/106

* cited by examiner

*Primary Examiner* — Thoi Duong

(74) *Attorney, Agent, or Firm* — Fenwick & West LLP

(57) ABSTRACT

Minimum distances between features in high resolution liquid crystal displays are described. Specifically, minimum distances between a column spacer and contact holes in adjacent pixels are described. Maintaining a minimum distance between a column spacer and a contact hole prevents the column spacer from being unintentionally placed in a nearby contact hole. This unintentional placement can be more likely in high resolution displays due to reduced pixel size.

13 Claims, 15 Drawing Sheets

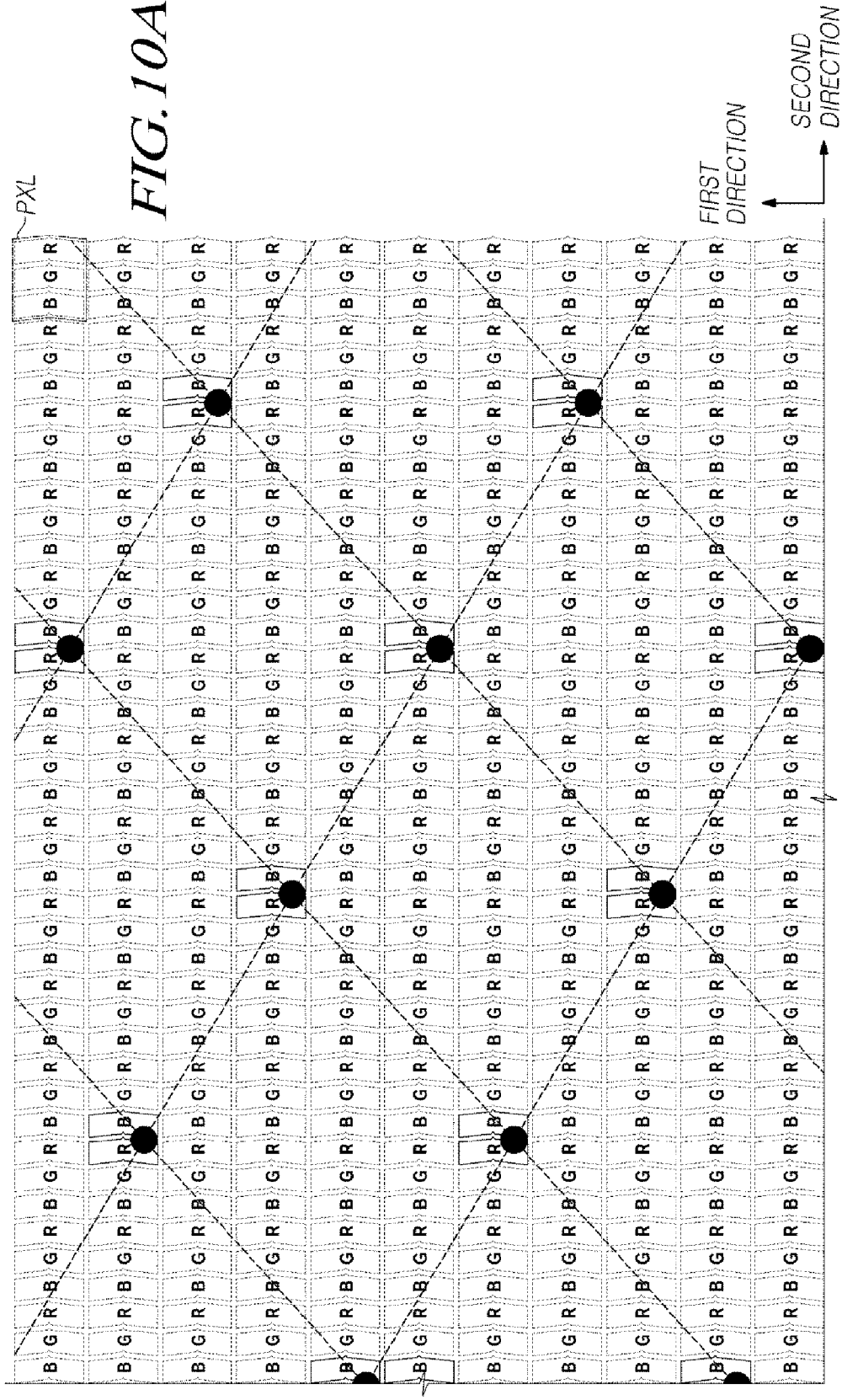

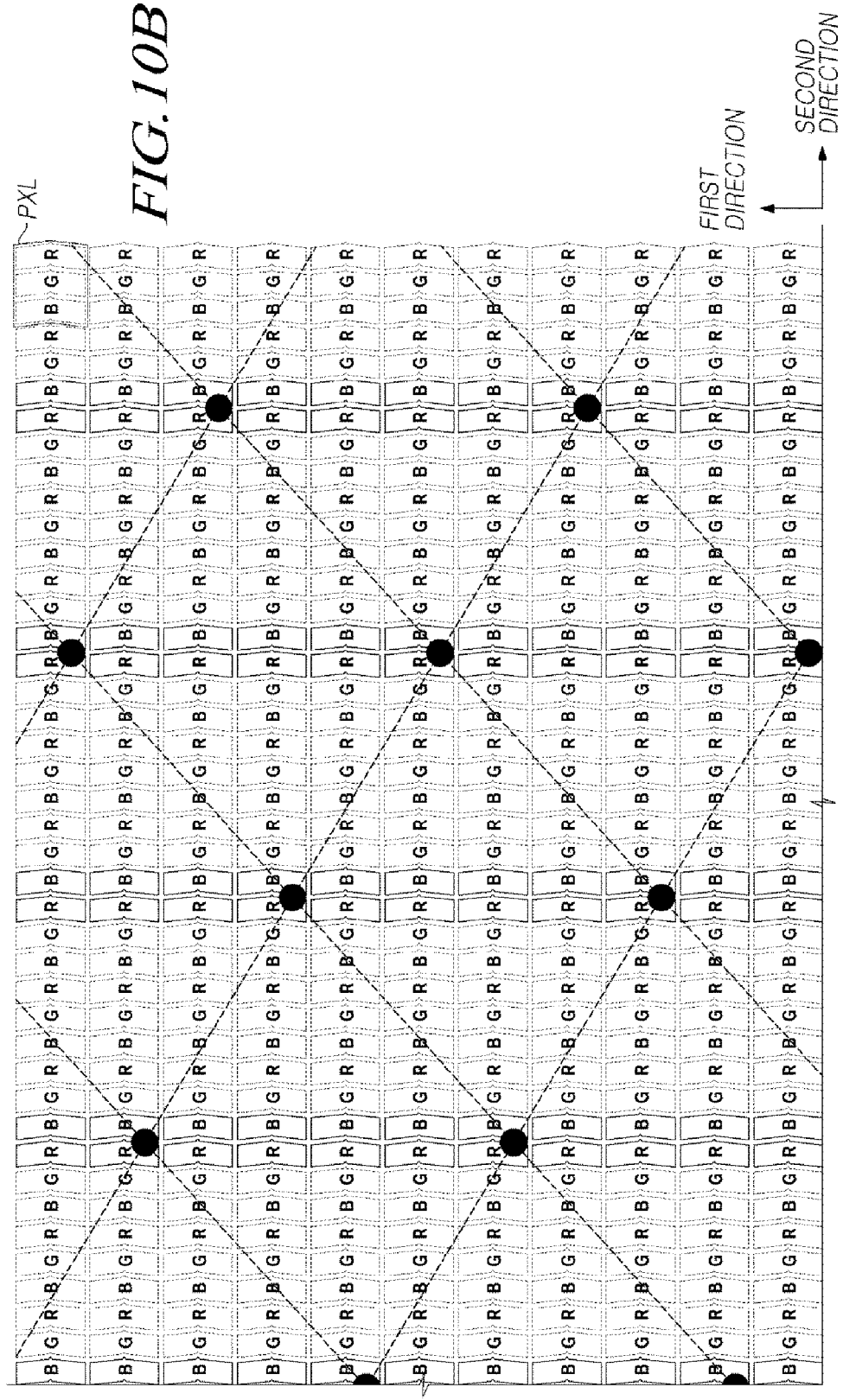

DISPLAY DEVICE

CROSS-REFERENCE TO RELATED APPLICATION

This application claims priority from and the benefit under 35 U.S.C. §119(a) of Korean Patent Application No. 10-2014-0064721, filed on May 28, 2014, which is hereby incorporated by reference for all purposes as if fully set forth herein.

BACKGROUND

1. Field of Art

The present invention relates to a display device which displays an image.

2. Description of the Related Art

As information oriented society has been developed, demands for displays for displaying an image are increasing. Thus, various flat displays such as a liquid crystal display (LCD), plasma display panel (PDP), and organic light emitting display (OLED) have been used recently.

In general, a liquid crystal display device includes a liquid crystal panel fabricated by bonding first and second substrates with a liquid crystal layer therebetween, and electrodes are formed on the facing surfaces of the first and second substrates so that the arrangement of liquid crystal molecules depends on an electric field applied to the electrodes to thereby make a difference in transmittance.

Meanwhile, spacers are provided between the first substrate and the second substrate in order to maintain a constant distance between the first substrate and the second substrate. The spacers are classified into ball spacers and column spacers according to their shapes and arrangement. The ball spacers are formed in such a manner to be distributed on the first substrate or the second substrate, and the column spacers are formed through patterning on the first or the second substrate.

Recently, column spacers have been widely used since they can be easily formed in a desired pattern at a specific location, and the column spacers are formed generally on a color filter substrate requiring a relatively small number of processes.

On the other hand, the higher the resolution of the liquid crystal display device becomes, the closer the distance between the pixels does. Laminating the first substrate and the second substrate, an arrangement defect of lamination is generated. This may lead to the gap stain on the display panel because of shifting the liquid crystal.

SUMMARY

A liquid crystal display device pixel includes a first alignment layer disposed over a first substrate, a second alignment layer disposed below a second substrate, and a passivation layer disposed below the first alignment layer over the first substrate. The passivation layer defines a contact hole, which exposes a portion of a drain electrode of a thin film transistor. The liquid crystal display device pixel also includes a first column spacer disposed between the first alignment layer and the second alignment layer. The first column spacer has a first end proximate to the first alignment layer and a second end proximate to the second alignment layer. A minimum lateral distance between the first end of the first column spacer and the contact hole is a sum of a predetermined design value plus an alignment margin.

In one embodiment, the alignment margin is measured from an outer edge of the first end of the first column spacer to an outer edge of the contact hole. The alignment margin is equal to or greater than a minimum alignment margin and equal to or less than a lateral distance between a data line and a pixel electrode of the liquid crystal display.

In one embodiment, the minimum lateral distance is the sum of the predetermined design value plus the alignment margin and further includes an added value of a radius of the first end of the first column spacer, the minimum lateral distance measured from a center of the first end of the first column spacer to an outer edge of the contact hole.

In one embodiment, the minimum lateral distance is the sum of the predetermined design value plus the alignment margin and further includes an added value of a difference between a radius of the first end of the first column spacer and a radius of a first end of a second column spacer, the first end of the second column spacer proximate to the first alignment layer.

A method of fabricating a liquid crystal display device includes providing a thin film transistor array on a first substrate, and forming a first passivation layer over the thin film transistor array, the first passivation layer defining a plurality of contact holes that each expose a portion of a corresponding drain electrode of a plurality of thin film transistors of the thin film transistor array. A first alignment layer is formed over the first passivation layer and a second alignment layer is formed on a second substrate. A column spacer is formed on the second alignment layer. The second substrate, the second alignment layer and the column spacer are disposed over the first alignment layer. The column spacer has a first end proximate to the first alignment layer and a second end proximate to the second alignment layer. The first end of the column spacer is separated from the contact hole by a minimum lateral distance that is a sum of a predetermined design value plus an alignment margin In one embodiment, the alignment margin is measured from an outer edge of the first end of the column spacer to an outer edge of the contact hole. The alignment margin is equal to or greater than a minimum alignment margin and equal to or less than a lateral distance between a data line and a pixel electrode of the liquid crystal display.

In one embodiment, the minimum lateral distance between the first end of the column spacer and the contact hole is measured from a center of the first end of the column spacer to an outer edge of the contact hole.

In one embodiment, the minimum lateral distance is a sum of the predetermined design value plus the alignment margin plus a first radius of the first end of the column spacer.

In one embodiment, the minimum lateral distance is a sum of the predetermined design value plus the alignment margin plus a difference between a second radius of the second end of the column spacer and the first radius of the first end of the column spacer.

In another method of fabricating a liquid crystal display device a thin film transistor array is provided on a first substrate. A first passivation layer is formed over the thin film transistor array, the first passivation layer defining a plurality of contact holes that each expose a portion of a corresponding drain electrode of a plurality of thin film transistors of the thin film transistor array. A first alignment layer is formed over the first passivation layer. A second alignment layer is formed on a second substrate. A first column spacer is formed on the second alignment layer, the column spacer having a second end attached to the second alignment layer and a first end opposite the second end. The second alignment layer is disposed over the first alignment layer such that the first end of the first column spacer is separated from the contact hole by a minimum lateral distance that is a sum of a predetermined design value plus an alignment margin, and the first column spacer has a height less than a distance between the first alignment layer and the second alignment layer.

In one embodiment the alignment margin is measured from an outer edge of a circumference on the first alignment layer corresponding to the first end of the first column spacer to an outer edge of the contact hole, and the alignment margin is equal to or greater than a minimum alignment margin and equal to or less than a lateral distance between a data line and a pixel electrode of the liquid crystal display.

In one embodiment, the minimum lateral distance is the sum of the predetermined design value plus a first radius of the first end of the first column spacer, the minimum lateral distance measured from a point on the first alignment layer corresponding to a center of the first end of the first column spacer to an outer edge of the contact hole.

In one embodiment, the minimum lateral distance is the sum of the predetermined design value plus the alignment margin and further includes an additional value of a difference between a radius of a first end of a second column spacer and the radius of the first end of the first column spacer A liquid crystal display device includes an array of pixels, each pixel including a passivation layer defining a contact hole and a plurality of column spacers disposed only within a first group of pixels of the array of pixels at a plurality of boundaries between adjacent pixels of the first group. A first distance between a contact hole of a first pixel of the first group and a contact hole of an adjacent second pixel of the first group is greater than a second distance between a contact hole of a first pixel of the second group of pixels and a contact hole of an adjacent second pixel of a second group of pixels In one embodiment, the liquid crystal display device includes a minimum lateral distance between an end of a column spacer disposed between the first pixel of the first group and the adjacent second pixel of the first group, where the minimum lateral distance is a sum of a predetermined design value plus an alignment margin.

In one embodiment, the alignment margin is measured from an outer edge of the end of the column spacer to each of an outer edge of the contact hole of the first pixel of the first group of pixels and to an outer edge of the contact hole of the second pixel of the second group of pixels, the alignment margin is equal to or greater than a minimum alignment margin and equal to or less than a lateral distance between a data line and a pixel electrode of each of the first pixel of the first group of pixels and the adjacent second pixel of the second group of pixels.

In one embodiment, the minimum lateral distance is the sum of the predetermined design value plus the alignment margin and further includes an added value of a radius of the end of the column spacer.

BRIEF DESCRIPTION OF THE DRAWINGS

FIGS. 10A to 10C are sectional views illustrating the method for fabricating the organic light device in FIG. 5 according to another embodiment.

DETAILED DESCRIPTION OF THE EXEMPLARY EMBODIMENTS

Figure 1:
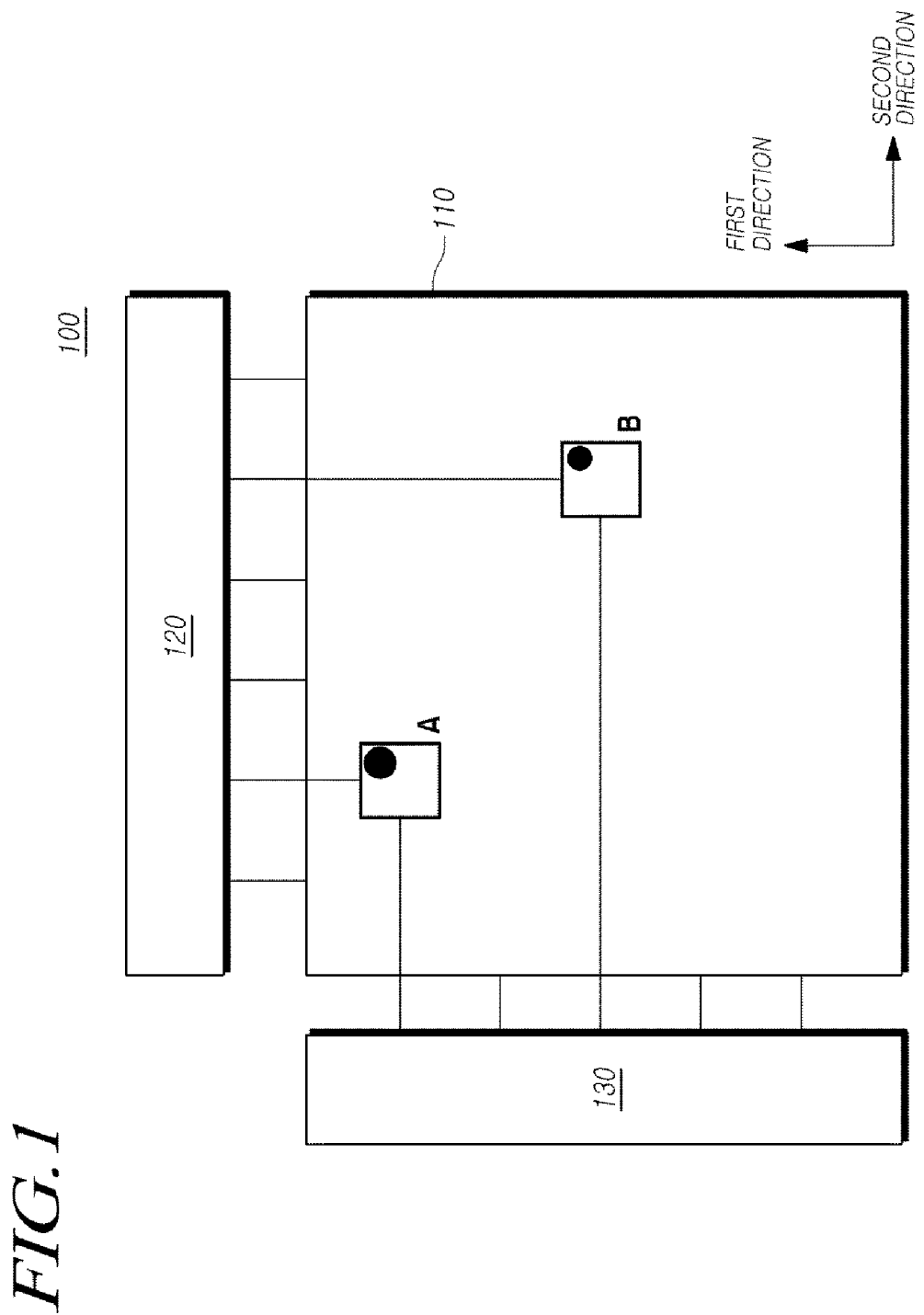
FIG. 1 is a view illustrating a system configuration of a display device according to one embodiment.

Hereinafter, embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention unclear.

In addition, terms, such as first, second, A, B, (a), (b) or the like may be used herein when describing components of the present invention. Each of these terminologies is not used to define an essence, order sequence or number of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 is a view illustrating a system configuration of a display device according to one embodiment.

Referring to FIG. 1, the display device 100 according to one embodiment may include a display panel 110, a data driver 120, a gate driver 130 and the like.

Each pixel on the display panel 110 is defined at each crossing portion of the plurality of gate lines and the plurality of data lines. Each pixel on the display panel 110 may be at least one of a red pixel (R), a green pixel (G), a blue pixel (B) and the like. Portions of "A" and "B" in FIG. 1 are examples of pixels on the display panel 110 as described below. Circles in the portions of "A" and "B" in FIG. 1 may refer to a first column spacer and a second column spacer as described below.

One of a source electrode and a drain electrode of a transistor in a pixel region of each pixel may be connected to one data line. The other of them may be connected to a pixel electrode. A gate electrode of the transistor may be connected to the one gate line.

The data driver 120 may supply a data signal (an analog pixel signal or a data voltage) to a plurality of data lines.

The gate driver 130 may supply a gate signal (a gate pulse, a scan pulse or a gate on signal) to a plurality of gate lines.

The display device 100 according to one embodiment may further include a timing controller (not shown) to control a driving timing the data driver 120 and the gate driver 130.

The data driver 120 may include a plurality of data driving integrated circuits (i.e. a data driver ICs, may be referred to as a source driving integrated circuit). The plurality of data driving integrated circuits (ICs) may be connected to a bonding pad of the display panel 110 in a Tape Automated Bonding (TAB) manner or a Chip On Glass (COG) manner. Alternatively, the plurality of data driving ICs may be directly formed on the display panel 110 in a Gate In Panel (GIP) type, and may be integrated on the display panel 110 according to circumstances.

The gate driver 130 may be positioned on only one side of the display panel 110 as illustrated in FIG. 1, or may be divided into two and positioned on both sides of the display panel 110, depending on a driving type.

In addition, the plurality of gate driving ICs (i.e. the gate driver ICs) included in the gate driver 130 may be connected to the bonding pad of the display panel 110 in the TAB manner or the COG manner. Alternatively, the plurality of gate driving ICs may be directly formed on the display panel 110 in the GIP type, or may be integrated on the display panel 110 according to circumstances. The display device 100 according to one embodiment may be an IPS (In-Plane Switching) mode of LCD which arranges liquid crystal molecules in plane and rotates them in place to display a screen, thereby advantageously having high resolution, low power consumption and wide viewing angle. More specifically, the display device 100 according to one embodiment may be an AH-IPS (Advanced High Performance-IPS) mode of LCD.

Figure 2:
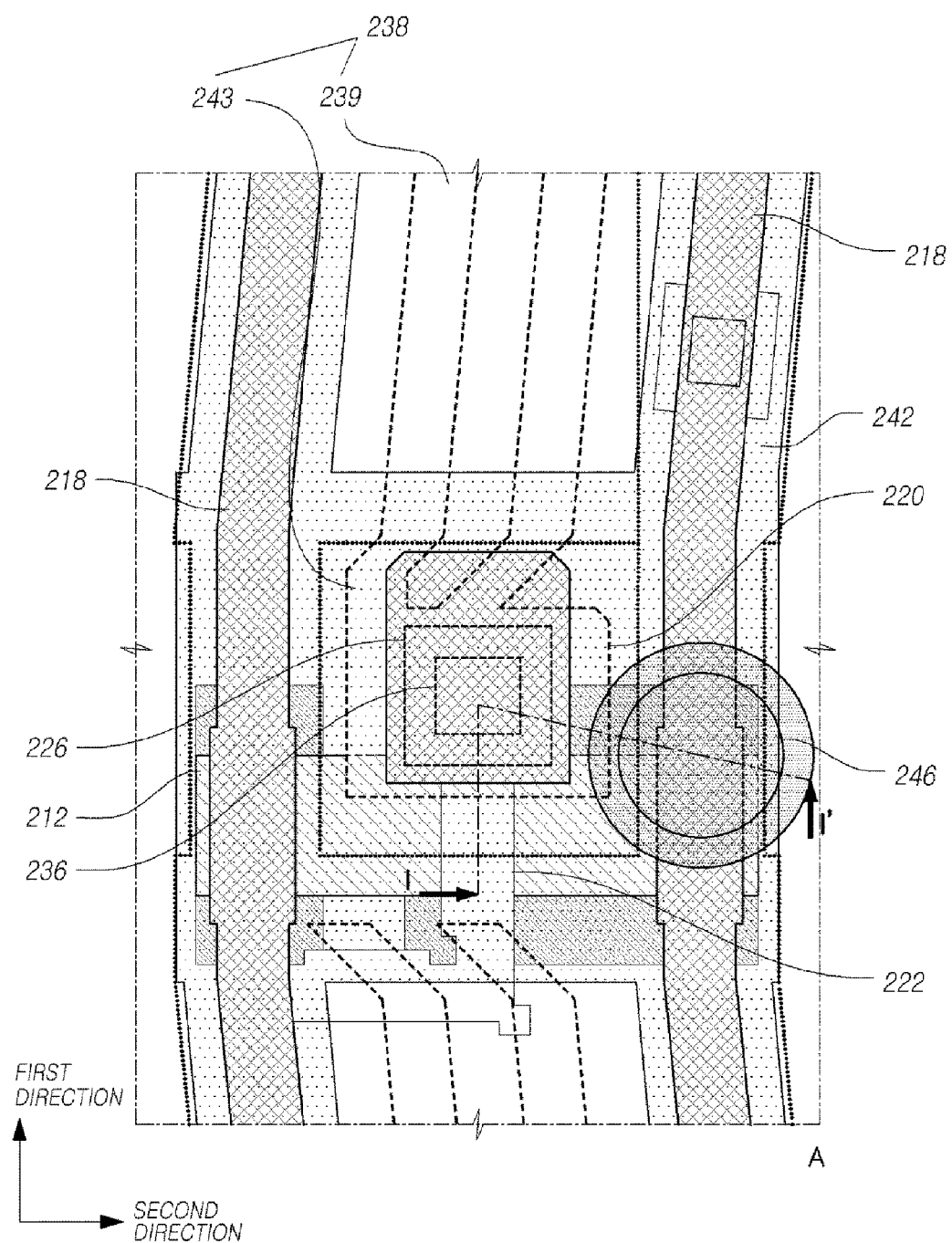
FIG. 2 is a planar view schematically illustrating the portion of "A" of a display device in FIG. 1.
Figure 3:
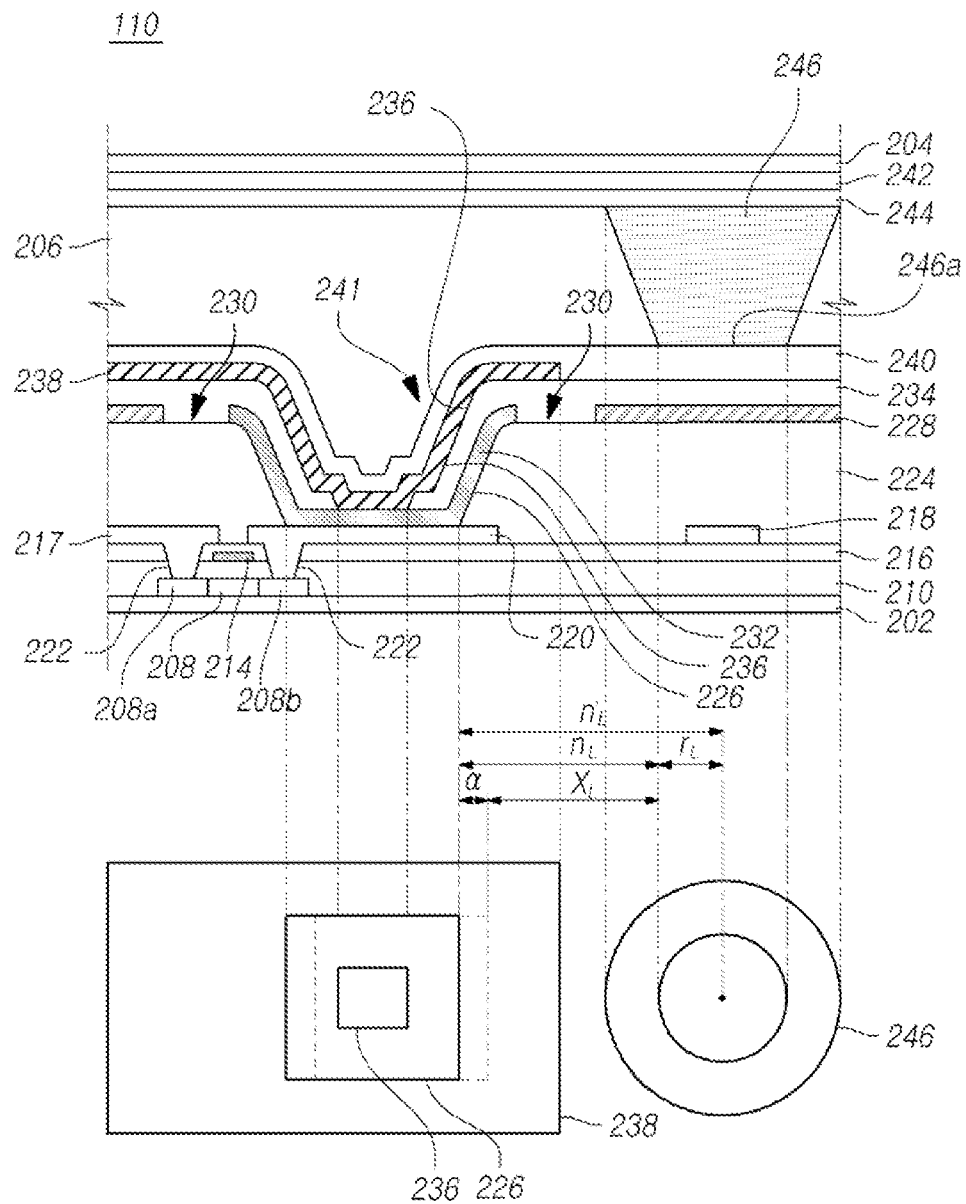
FIG. 3 is a cross-sectional view of line I-I' in FIG. 2.

FIG. 2 is a planar view schematically illustrating the portion of "A" of a display device in FIG. 1. FIG. 3 is a cross-sectional view of line I-I' in FIG. 2.

Referring to FIG. 2 and FIG. 3, a first substrate 202 and a second substrate 204 are spaced apart from and face each other with a distance therebetween. An aperture area in which an image is displayed and a shielding area in which no image is displayed, are defined on the first substrate 202 and the second substrate 204. A liquid crystal layer 206 is positioned between the first substrate 202 and the second substrate 204. There is an active layer 208 including a source region 208a and a drain region 208b on the first substrate 202. More specifically, the active layer 208 may consist of one of a semiconductor material such as amorphous silicon and a poly-silicon such as LTPS, HTPS and the like. The active layer 208 may consist of an oxide semiconductor such as a zinc oxide (ZO), an indium gallium zinc oxide (IGZO), a zinc indium oxide (ZIO) and Ga doped ZnO (ZGO). The active layer 208 may become a channel of the thin film transistor T.

The first insulating layer 210 may be located on the active layers 208.

The gate line 212 may be located on the first insulating layer 210 in a second direction. The gate electrode 214 may be connected to the gate line 212 on the first substrate 202.

The gate line 212 and the gate electrode 214 may be located in the shielding area. The second insulating layer 216 may be located on the gate line 212 and the gate electrode 214.

The data line 218 may be located on the second insulating layer 216 with the first direction in the shielding area. A source electrode 217 and a drain electrode 220 spaced apart from the source electrode 217 may be located on the second insulating layer 216. The source electrode 217 may be connected to the data line 218. The source and drain electrodes 217 and 220 may be connected to the source and the drain regions 208a and 208b of the active layer 208 through a source/drain contact hole 222 in the first and the second insulating layers 210 and 216 respectively.

The gate electrode 214, the active layer 208, the source electrode 217, and the drain electrode 220 constitute the thin film transistor. The active layer 208 between the source electrode 217 and the drain electrode 220 may become a channel of the thin film transistor T. Here, the thin film transistor is not limited to the structure shown in FIGS. 2 and 3, and the structure of the thin film transistor can be varied.

A first passivation layer 224 may be located on the source electrode 217 and the drain electrode 220. A first contact hole 226 in the first passivation layer 224 may expose a part of the drain electrode 220. A planar shape of the first contact hole 226 may be a quadrangle such as a rectangular and a square, but it is not limited thereto.

Here, the first passivation layer 224 may be formed of an inorganic material such as $SiO_2$ and $SiN_x$, and an organic material such as a photo-acryl, but it is not limited thereto. The first passivation layer 224 may be formed of a photosensitive compound such as a photo active compound (PAC), a photo acid generator (PAG) and the like, in order to reduce the power consumption by reducing a data load between the data line 218 and the pixel electrode 238 as described below.

The first passivation layer 224 may be thicker than another insulation layers such as the second layer 216 and a second passivation layer 234 described below. For example, the thickness of the first passivation layer 224 2~3 µm, it is not limited thereto. Therefore the first contact hole 226 of the first passivation layer 224 may be formed to be relatively steep.

A common electrode 228 may be located on the first passivation layer 224. The common electrode 228 may be formed of a transparent conductive material such an indium tin oxide (ITO), an indium zinc oxide (IZO), an indium tin zinc oxide (ITZO) and the like. The common electrode 228 may be arranged over the entire surface of the first substrate 202. The common electrode 228 may include an opening 230 corresponding to the drain electrode 220 of the thin film transistor. A connecting pattern 232 with the same material of the common electrode 228 may be located on the drain electrode 220 and the side wall of the first contact hole 226 in a port of the opening 230 through the first contact hole 226.

The second passivation layer 234 may be located on the common electrode 228. The second passivation layer 234 may be formed of an inorganic insulation material such as $SiO_2$ and $SiN_x$, but it is not limited thereto. The second passivation layer 234 may be thinner than the first passivation layer 224.

The second passivation layer 234 may include the second contact hole 236 to expose the connecting pattern 232. The second contact hole 236 may be located within the opening 230 of the common electrode 228. A planar shape of the second contact hole 236 may be a quadrangle such as a rectangular and a square, but it is not limited thereto. The second contact hole 236 may be narrower than the first contact hole 226.

The pixel electrode 238 may be located on the second passivation layer 234 in the aperture area of each pixel region. The pixel electrode 238 may be formed of a transparent conductive material such an indium tin oxide (ITO), an indium zinc oxide (IZO), an indium tin zinc oxide (ITZO) and the like, but it is not limited thereto. The pixel electrode 238 may be connected to the drain electrode 220 through the first and the second contact holes 226 and 236. As mentioned above, the connecting pattern 232 with the same material of the common electrode 228 may be located between the drain electrode 220 and the pixel electrode 238.

The pixel electrode 238 may include a plurality of electrode patterns 239 and a connecting pattern 243 for the pixel electrode as shown in FIG. 2. The plurality of electrode patterns 239 are extended from the connecting pattern 243 for the pixel electrode 238 with the first direction and spaced apart from each other along the second direction. The plurality of electrode patterns 239 and the connecting pattern 243 for the pixel electrode 238 may be one body, but it is not limited thereto. The connecting pattern 243 for the pixel electrode 238 may contact the connecting pattern 232 and the drain electrode 220 through the first contact hole 226 and the second contact hole 236 in each pixel region.

A first alignment layer 240 may be located on the pixel electrode 238. The first alignment layer 240 may be rubbed along the first direction or the second direction. The first alignment layer 240 has a step height 241 at its top surface due to the first contact hole 226. Because the first contact hole 226 is thicker than other insulating layers as mentioned above, the step height 241 may be steep.

A black matrix 242 and a color filter (not shown) may be disposed on the second substrate 204. The black matrix 242 may be arranged in the shielding area. The second alignment layer 244 may be located on the black matrix 242 and the color filter. A first column spacer 246 may be located on the second alignment layer 244 corresponding to the black matrix 242 in the shielding area.

Here, the first column spacer 246 may have a shape of truncated cone of which the diameter is smaller from the second substrate 204 to the first substrate 202, but it is not limited thereto. The first column spacer 246 may be located in the shielding area. That is, the first column spacer 246 may be located between the data line 218 and the black matrix 242 on the second substrate 204 in the shielding area. The first column spacer 246 may be formed in each pixel region. The first column spacer 246 may be formed at constant interval, for example, eight pixels along the first direction and 4 pixels along the second direction, which will be described below.

The first column spacer 246 may be a cell gap-keeping spacer to keep a cell gap between the first substrate 202 and the second substrate 204 by supporting the first alignment layer 240 of the first substrate 202. A flat end part 246a of the first column spacer 246 is contacted with the first alignment layer 240 on the first substrate 202.

If the radius of the end part 246a of the first column spacer 246 is $r_L$, the shortest distance $n_L$ between the end part 246a of the first column spacer 246 and the first contact hole 226 may be expressed by equation 1.

$$n_L = x_L + \delta \quad \text{[Equation 1]}$$

Figure 4A:
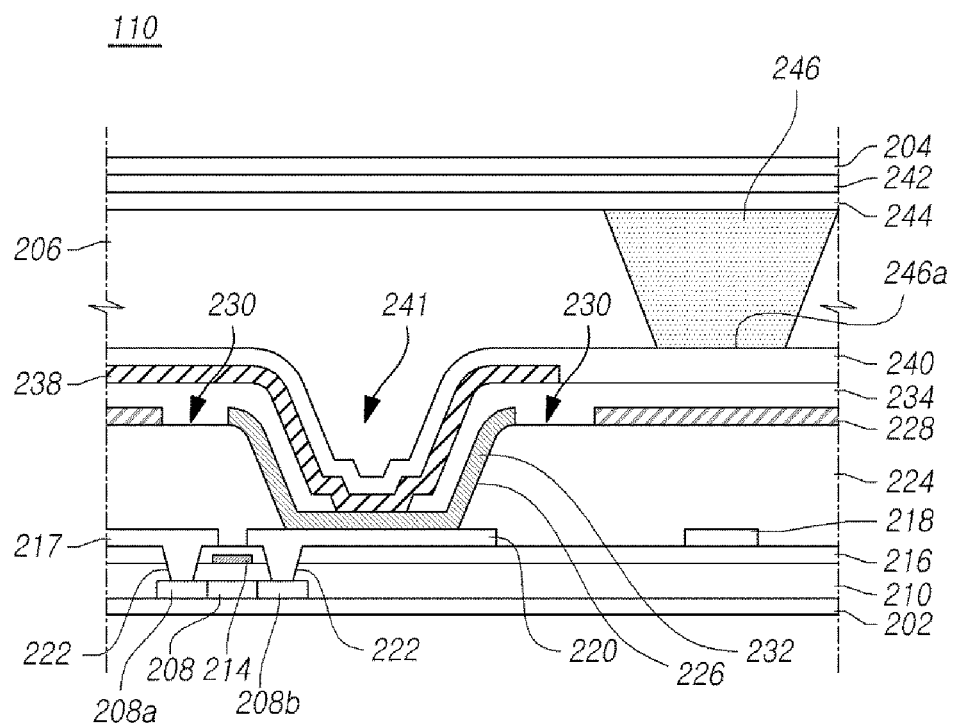
FIG. 4A and FIG. 4B are cross-sectional views of the display device when the second substrate is not shifted and when the second substrate is shifted during the alignment process, respectively.
Figure 4B:
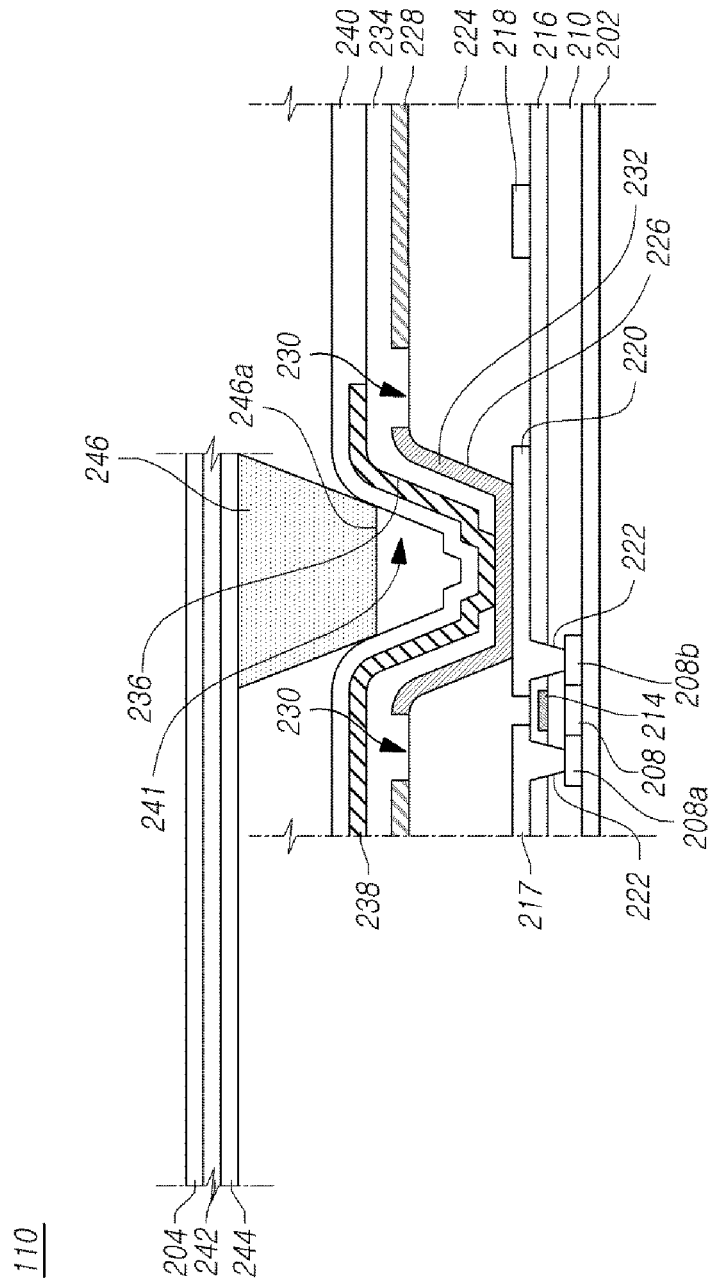

In the equation 1, $x_L$ may be the typical design value which does not take into account the alignment margin in accordance with the process design. $\delta$ may be equal to or larger than the minimal alignment margin $\alpha$ as shown in FIG. 3, and equal to or smaller than the maximal alignment margin $\beta$ in accordance with the minimum distance along the second direction between the data line 218 and the pixel electrode 238. That is $\alpha \leq \delta \leq \beta$. Here, the typical design value may mean the design value of the shortest distance between the end part 246a of the first column spacer 246 and the first contact hole 226 in the display panel with the lower resolution. The minimal alignment margin may mean a minimum alignment error value when the second substrate is shifted during the alignment process as shown in FIGS. 4A and 4B. The maximal alignment margin may mean a maximum alignment error value when the second substrate is shifted during the alignment process as shown in FIGS. 4A and 4B. Therefore various display panels which are manufactured with the same alignment equipment may have the alignment margin between the minimal and the maximal alignment margins during the alignment process.

More specifically, as the display resolution increases, the distance between the first contact hole 226 of the first passivation layer 224 and the first column spacer 246 for the cell gap is reduced. For example, the display resolution of QHD (Quarter Full High Definition) is 2560×1440 which amounts to twice the conventional full HD of 1920×1080 and is 538 ppi (pixels per inch). In this case the conventional full HD, the shortest distance between the end part 246a of the first column spacer 246 and the first contact hole 226 is the typical design value. Although the display resolution increases, the shortest distance $n_L$ between the end part 246a of the first column spacer 246 and the first contact hole 226 is equal to or larger than the typical design value $x_L$ plus the minimal alignment margin $\alpha$, thereby preventing the first column spacer 246 from being inserted in the first contact hole 226 or be slipped down the step height 241. Although the first column spacer 246 is shifted during the alignment process, the first column spacer 246 isn't inserted in the first contact hole 226 or slipped down the step height 241, thereby preventing a gap stain caused by the alignment defect.

Meanwhile, as the first column spacer 246 is maximally spaced apart the first contact hole 226, this may prevent the first column spacer from being inserted in the first contact hole 226 or being slipped down the step height 241. Although the first column spacer 246 is maximally spaced apart the first contact hole 226 where the connecting pattern 232 of the pixel electrode 238 is contacted with the drain electrode 220, there needs to maintain the design margin so that the connecting pattern 232 cannot be contacted with the adjacent data line 218, thereby being short as a contact defect. The shortest distance $n_L$ between the end part 246a of the first column spacer 246 and the first contact hole 226 is equal to or larger than the typical design value $x_L$ plus the minimal alignment margin $\alpha$.

For example, when the center of the first column spacer 246 is substantially located on the center of the data line 218, the shortest distance $n'_L$ between the center of the first column spacer 246 and the first contact hole 226 may be expressed by equation 2 below.

$$n'_L = x_L + \delta + r_L \quad \text{[Equation 2]}$$

In the equation 2, $x_L$ may be the typical design value which does not take into account the alignment margin in accordance with the process design. $\delta$ may be equal to or larger than the minimal alignment margin $\alpha$, and equal to or smaller than the maximal alignment margin $\beta (\alpha \leq \delta \leq \beta)$. $r_L$ may be the radius of the end part 246a of the first column spacer 246.

For example, when $x_L$ is equal to 2.5 μm and the minimal alignment margin is 1.25 μm, the minimal distance between the end part 246a of the first column spacer 246 and the first contact hole 226 is more than 3.75 μm. That is, the shortest distance $n'_L$ between the center of the first column spacer 246 and the first contact hole 226 is more than 3.75 μm+$r_L$.

FIG. 4A and FIG. 4B are cross-sectional views of the display device when the second substrate is not shifted and when the second substrate is shifted during the alignment process, respectively.

In FIG. 4A, because the shortest distance between the end part 246a of the first column spacer 246 and the first contact hole 226 is more than the design value plus the minimal alignment margin, there may prevent the first column spacer 246 from being inserted in the first contact hole 226 or being slipped down the step height 241.

Meanwhile, in order to prevent the first column spacer 246 from being inserted in the first contact hole 226 or being slipped down the step height 241, the end part 246a of the first column spacer 246 may be maximally spaced apart the first contact hole 226. However, because the display resolution increases so that the width of each pixel may be reduced, there may be limited to increase the distance between the first column spacer 246 and the first contact hole 226.

If the distance between the first column spacer 246 and the contact hole 226 may be the typical design value, the shortest distance $n_L$ between the end part 246a of the first column spacer 246 may be equal to $x_L$. Therefore, as shown in FIG. 4A, when the first substrate 202 and the second substrate 204 are laminated during the alignment process, there is no problem if the second substrate 204 is not shifted during the alignment process. However, as shown in FIG. 4B, if the second substrate 204 is shifted during the alignment process, the first column spacer 246 is inserted in the first contact hole or slipped down the step height 241.

Figure 5:
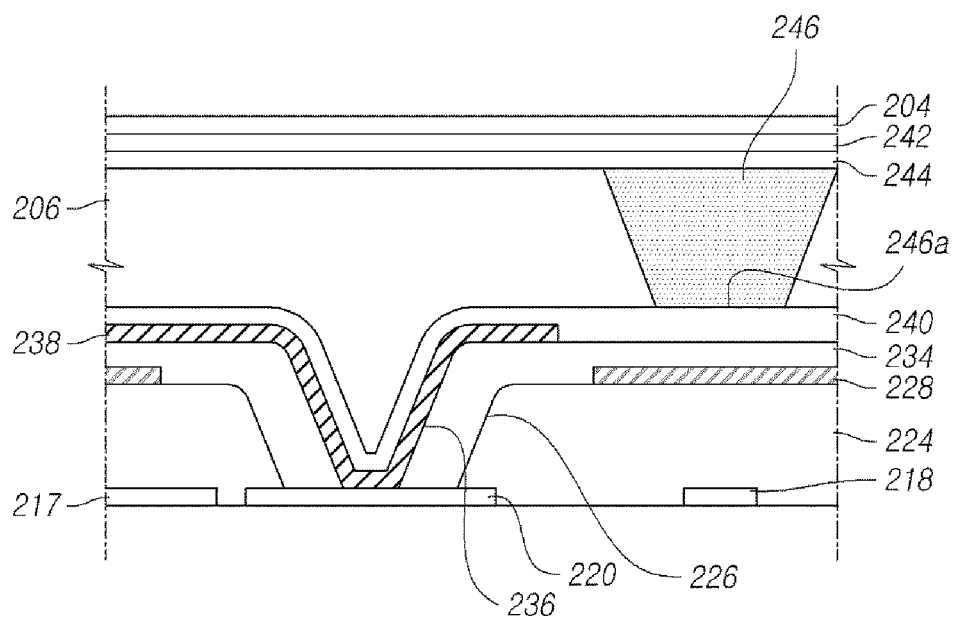
FIG. 5 is a cross-sectional view of the display device according to another embodiment.

As mentioned above, the connecting pattern 232 within the opening 230 of the common electrode 228 is located on the drain electrode 220 through the first contact hole 226 of the first passivation layer 224 as shown in FIG. 3. However, the connecting pattern 232 may not exist on the drain electrode 220 within the opening 230 of the common electrode 228. That is, the pixel electrode 238 may be directly contacted with the drain electrode 220 through the first contact hole 226 and the second contact hole 236 as shown in FIG. 5.

Figure 6:
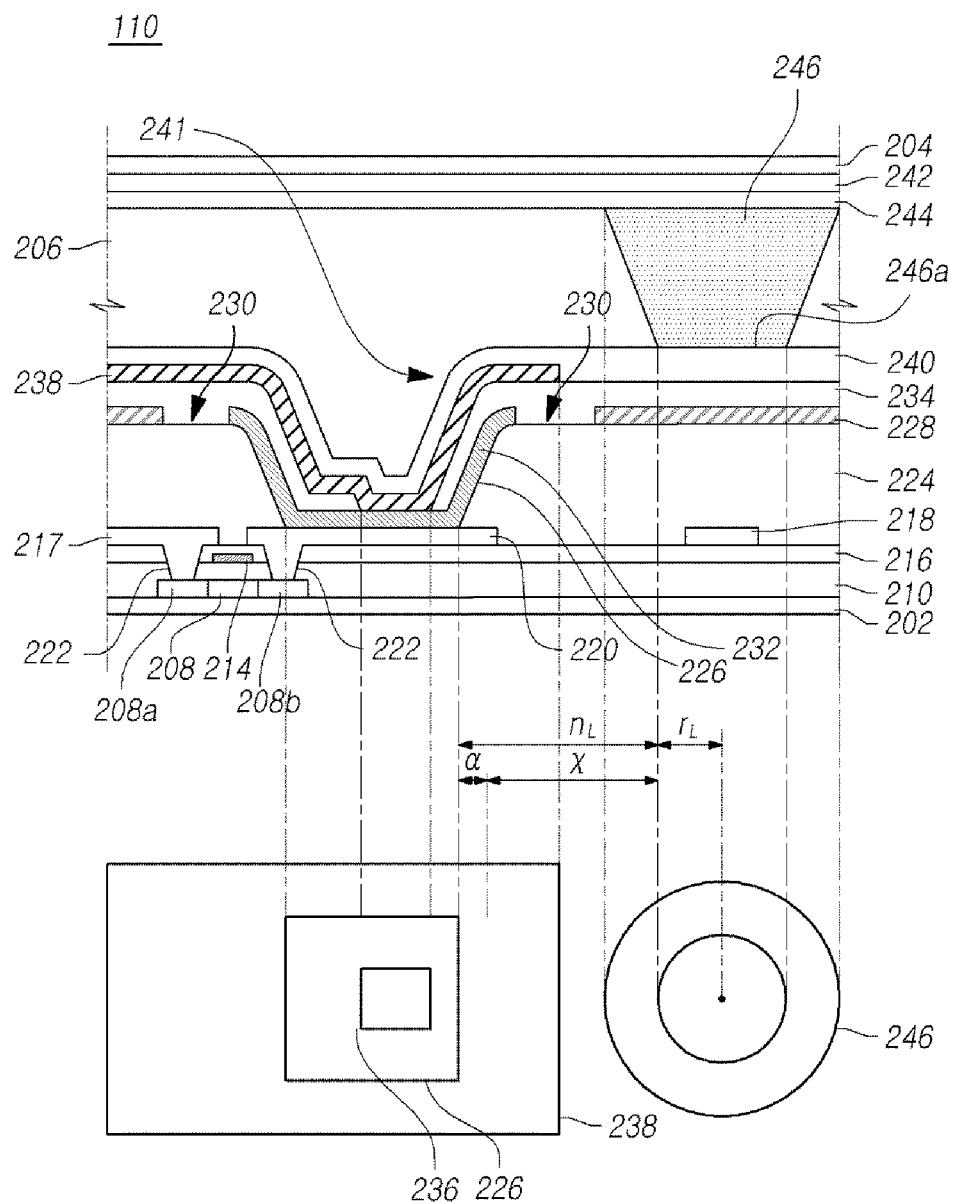
FIG. 6 is a cross-sectional view of the display device according to another embodiment.

As shown in FIG. 2 and FIG. 3, it is described above that the second contact hole 236 is also spaced apart the first column spacer 246 with the typical design value plus the minimal alignment margin in order to maintain the shortest distance between the first column spacer 246 and the contact hole 226. As an another example, although the shortest distance between the first column spacer 246 and the first contact hole 226 maintains the distance relationship of the equation 1, the second contact hole 236 is spaced apart the first column spacer 246 with just the design value as shown in FIG. 6. Although the second contact hole 236 is spaced apart the first column spacer 246 with just the design value, the first column spacer 246 may be not inserted in the contact hole 226 of the first passivation layer 224 which is thicker than another insulating layers such as the second insulation layer and the second passivation layer.

Figure 7:
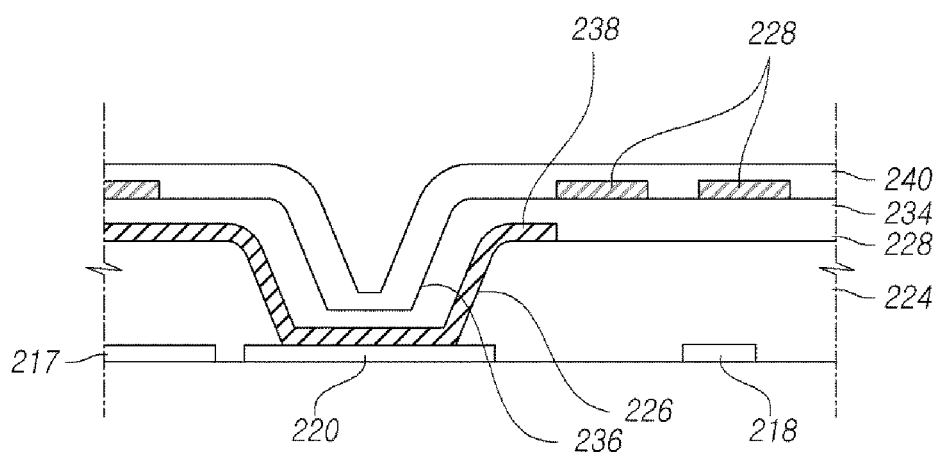
FIG. 7 is a cross-sectional view of the display device according to another embodiment.

It is described above that the common electrode 228 in the display device according to one embodiment is formed all over the first substrate 202 and the pixel electrode 238 is overlapped with the common electrode 228. As another example, the common electrode 228 and the pixel electrode 238 may include a plurality of the electrode patterns which are arranged in turn in each pixel region. As shown in FIG. 7, the pixel electrode 238 is formed all over each pixel region and the common may be located on the pixel electrode 238. The common electrode 228 may include a plurality of electrode patterns similar to the pixel electrode 238 as shown in FIG. 3.

Figure 8:
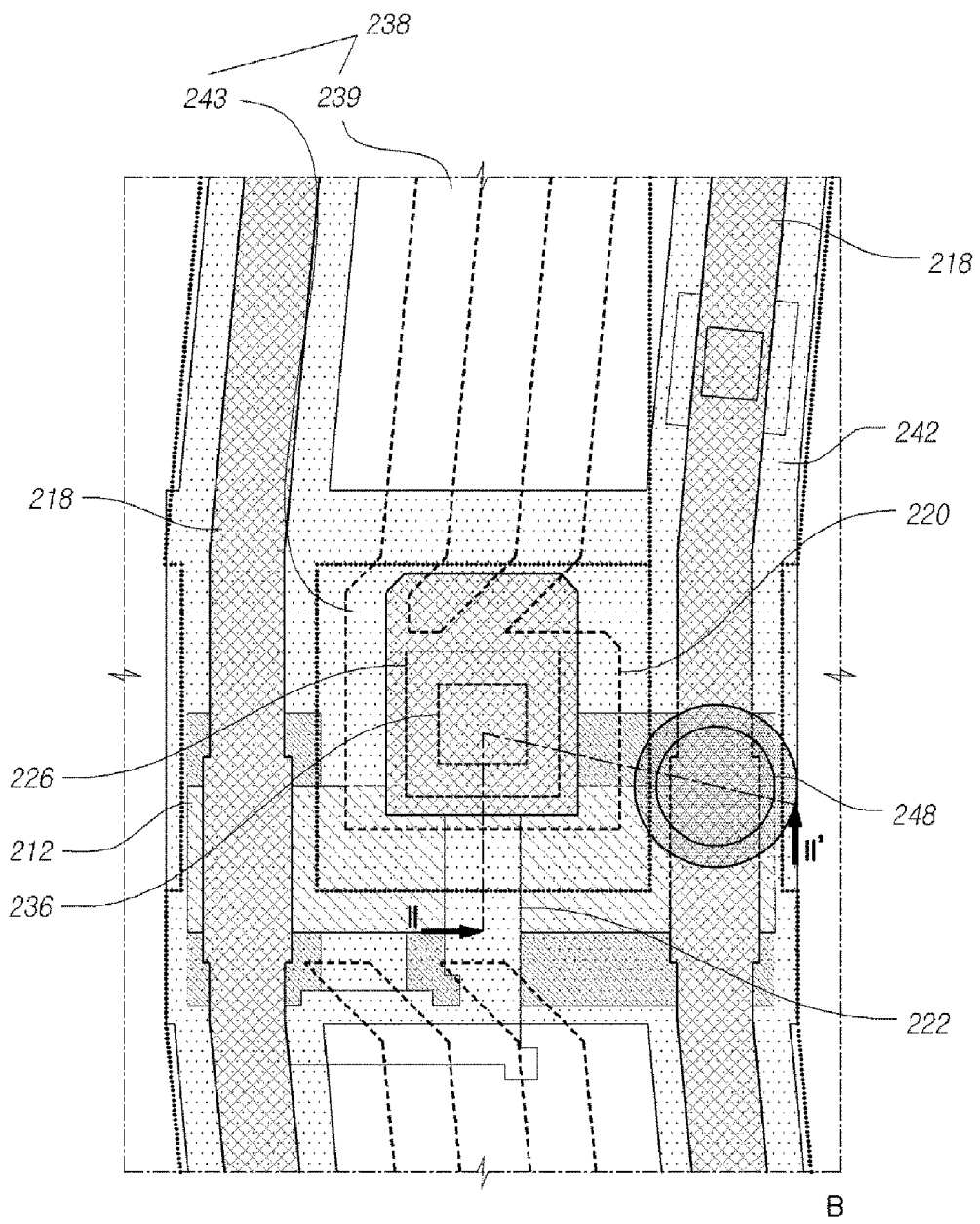
FIG. 8 is a planar view schematically illustrating the portion of "B" of a display device in FIG. 1.
Figure 9:
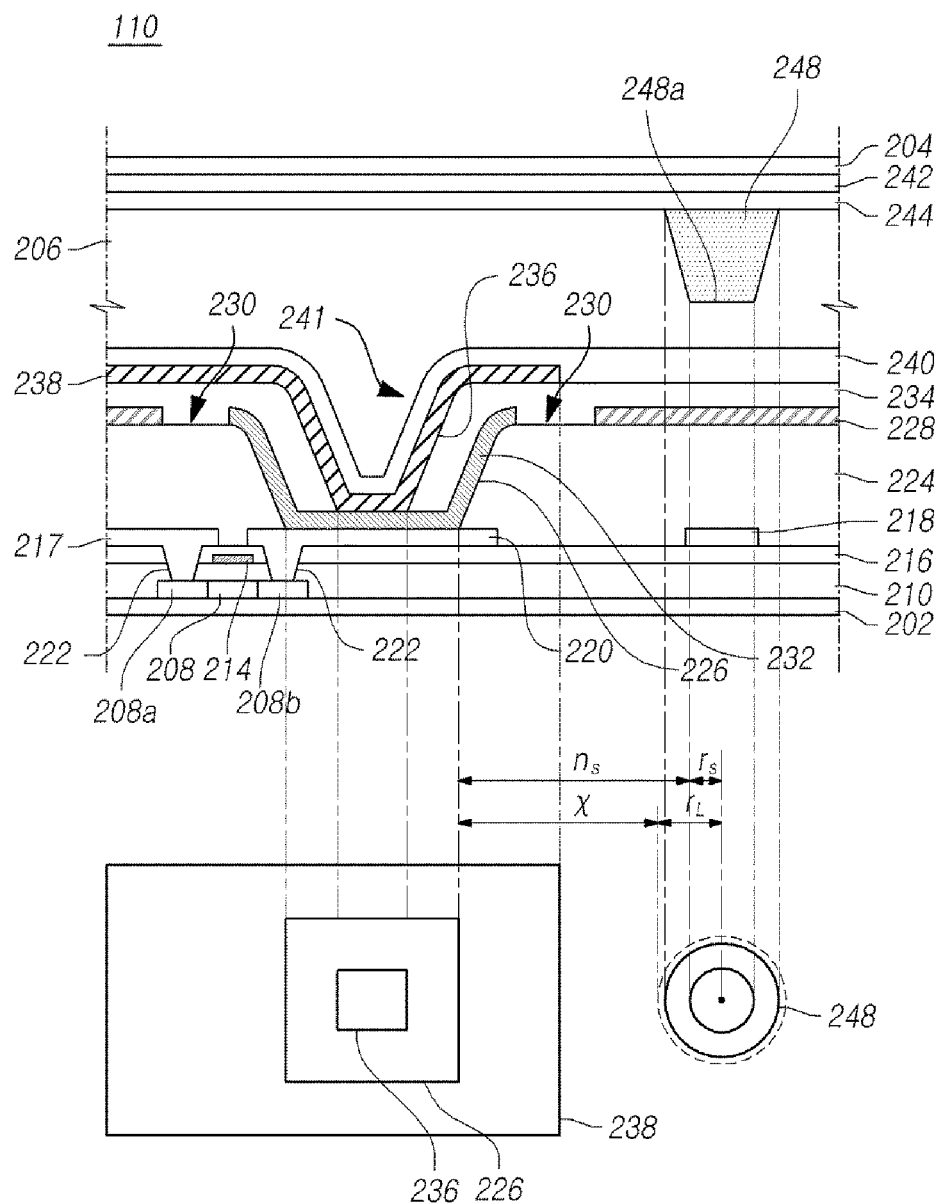
FIG. 9 is a cross-sectional view of line II-II' in FIG. 8.

FIG. 8 is a planar view schematically illustrating the portion of "B" of a display device in FIG. 1. FIG. 9 is a cross-sectional view of Line II-II' in FIG. 8.

Referring to FIG. 8 and FIG. 9, a pixel structure of the portion of "B" of the display device according to one embodiment may be equal to that of the portion of "A". Although the first column spacer 246 is spaced apart the first contact hole 226 with the distance relationship expressed by the equations 1 and 2 in the pixel structure of the portion of "A", the second column spacer 248 is spaced apart the first contact hole 226 with the distance relationship expressed by equation 3 in the pixel structure of the portion of "A" as described below.

More specifically, the second column spacer 248 is shorter than the first column spacer 246. The second column spacer 248 on the second substrate 204 is not contacted with the first alignment layer 240 on the first substrate 202. In other words, the second column spacer 248 on the second substrate 204 is separated from the first alignment layer 240 on the first substrate 202. The second column spacer 248 may be a press-preventing spacer to prevent the second substrate 204 from pressing the first substrate 202 when the second substrate 204 is pressed.

If the radius of the flat end part 248a of the second column spacer 248 is $r_s$, the shortest distance $n_s$ between the end part 248a of the second column spacer 248 and the first contact hole 226 may be expressed by equation 3.

$$n_s = x_L + (r_L - r_s) \quad \text{[Equation 3]}$$

In the equation 3, $x_L$ may be the typical design value which is equal to that in the equation 1. $r_L$ may be the radius of the end part 246a of the first column spacer 246.

In other words, the shortest distance $n_s$ between the end part 248a of the second column spacer 248 and the first contact hole 226 is the typical design value $(x_L)$ plus the difference $(r_L - r_s)$ of both the first and the second column spacers. In this example, the difference $(r_L - r_s)$ of both the first and the second column spacers may function as the alignment margin.

As another example, the shortest distance $n_s$ between the end part 248a of the second column spacer 248 and the first contact hole 226 may be expressed by equation 4.

$$n_s = X_L + \delta + (r_L - r_s) \quad \text{[Equation 4]}$$

In the equation 4, $\delta$ may be equal to or larger than the minimal alignment margin $\alpha$, and equal to or smaller than the maximal alignment margin as state in the equation 1.

Although the second column spacer 248 is shifted during the alignment process, the second column spacer 248 isn't inserted in the first contact hole 226 or slipped down the step height 241, thereby preventing a gap stain caused by the alignment defect.

In view of the pixel structure, the location of the first contact hole 226 in FIGS. 8 and 9 is equal to that of the first contact hole 226 as shown in FIGS. 2 and 3. Therefore the first contact hole 226 may be located at the same location in all pixels on the display panel 110.

In contrast, the pixel structure where the shortest distance $n_L$ between the end part 246a of the first column spacer 246 and the first contact hole 226 is expressed by the equations 1 and 2, may be configured for some special pixels among all pixels adjacent to the data line 218. For example, some special pixels may be pixels which are adjacent to the first column spacer 246.

Figure 10C:
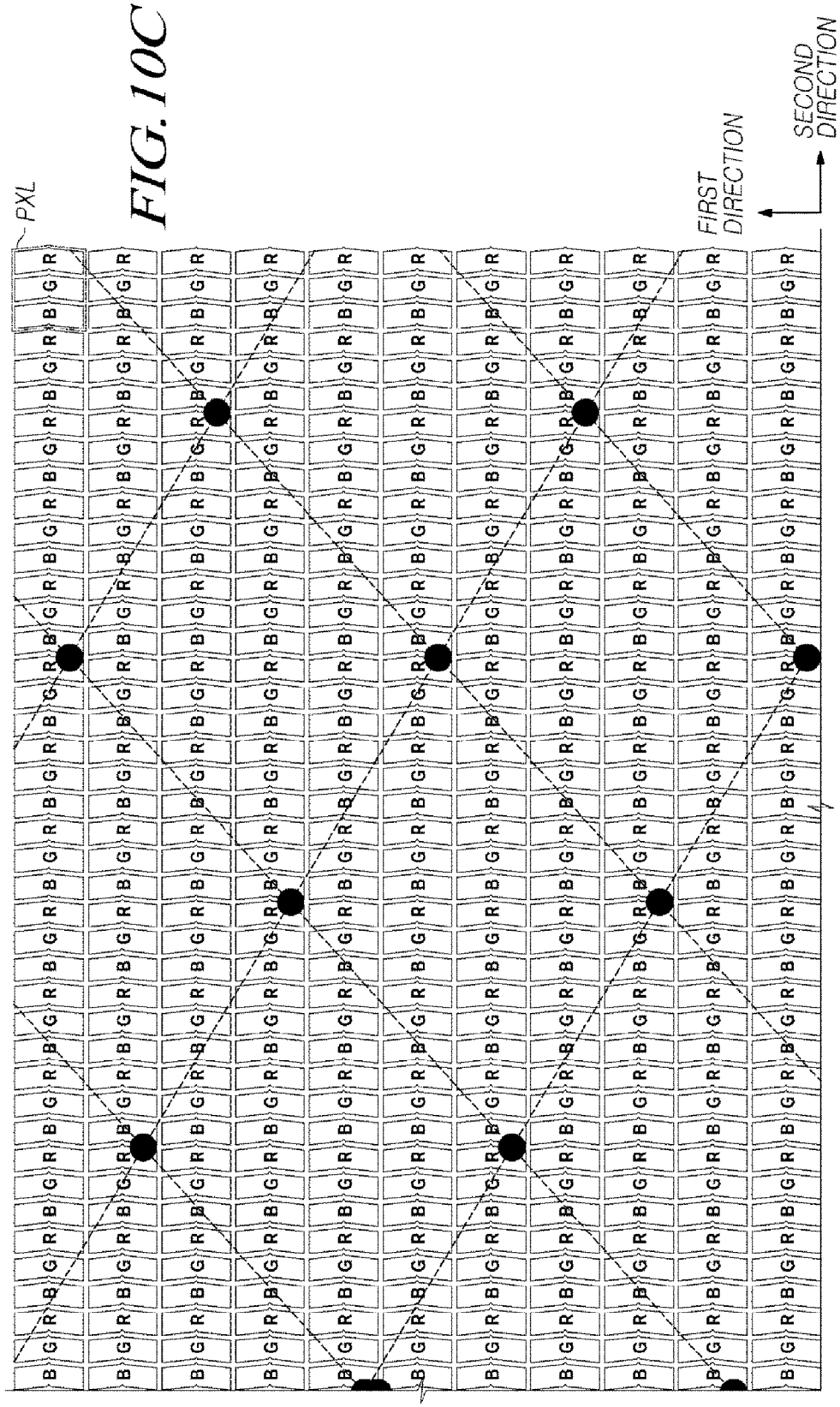

The pixel structure mentioned above may be configured for only two pixels adjacent to the first column spacer 246 over which the first column spacer 246 is located as shown in FIG. 10A, all pixels adjacent to the data line 218 over which the first column spacer 246 is located as shown in FIG. 10B, or all pixels on the display panel 110. This will be described in detail with reference to FIGS. 10A to 10C.

FIGS. 10A to 10C are planar views partially illustrating an alignment of pixels on the display device according to one embodiment.

As shown in FIGS. 10A to 10C, each pixel may include red, green and blue sub-pixels corresponding to sub-pixel regions respectively. In FIGS. 10A to 10C, circles may refer to the first column spacer. The sub-pixels indicated by a solid line may have the pixel structure described above with reference to FIGS. 2 and 3 regardless of the presence or absence of the first column spacer. The sub-pixels indicated by a dotted line may have the pixel structure described above with reference to FIGS. 8 and 9 regardless of the presence or absence of the second column spacer.

The arrangement density of the first column spacer may be higher than the density of the second column spacer. As an example, the first column spacer may be disposed per one pixel along the first direction and per six pixels along the second direction. As a result, four first column spacers may be arranged to achieve a rhombus-shaped as shown in FIGS. 10A to 10C.

Referring to FIG. 10A, the pixel structure mentioned above with reference to FIGS. 2 and 3 may be configured for only two sub-pixels such as red and blue sub-pixels adjacent to the data line 218 over which the first column spacer 246 is located. Therefore the shortest distance between the first column spacer 246 on the data line 218 and the first contact hole 226 in red and blue sub-pixels may be satisfied with the equation 1.

Referring to FIG. 10B, the pixel structure mentioned above with reference to FIGS. 2 and 3 may be configured for all sub-pixels such as red and blue sub-pixels adjacent to the data line 218 over which the first column spacer 246 is located. Therefore the shortest distance between the first column spacer 246 on the data line 218 and the first contact hole 226 in all red and blue sub-pixels adjacent to the data line 218 may be satisfied with the equation 1. In other words, although there is no the first column spacer on the data line adjacent to some sub-pixels, the shortest distance between a virtual first column and the contact hole in some red and blue sub-pixels may be also satisfied with the equation 1.

Referring to FIG. 10C, the pixel structure mentioned above with reference to FIGS. 2 and 3 may be configured for all pixels on the display panel 110. Therefore the shortest distance between the real and virtual first column spacer 246 on the data line 218 and the first contact hole 226 in all pixels on the display panel 110 may be satisfied with the equation 1.

Because the shortest distance between the first column spacer 246 on the data line 218 and the first contact hole 226 in all red and blue sub-pixels adjacent to the data line 218 shown in FIGS. 10B and 10C may be satisfied with the equation 1, thereby increasing pattern consistency when there performs the mask processes on the substrate 202.

The higher the resolution of the liquid crystal display device becomes, the closer the distance between the pixels does. The above described embodiments may ensure the typical design value plus the alignment margin when the first substrate 202 and the second substrate 204 is laminated, thereby preventing the cell gap-keeping column spacer from be inserted in the contact hole of the first passivation layer. The above described embodiments may minimize the alignment defect and the gap stain on the display panel. Therefore the above described embodiments may improve the defect of the gap stain on the display panel.

Figure 11:
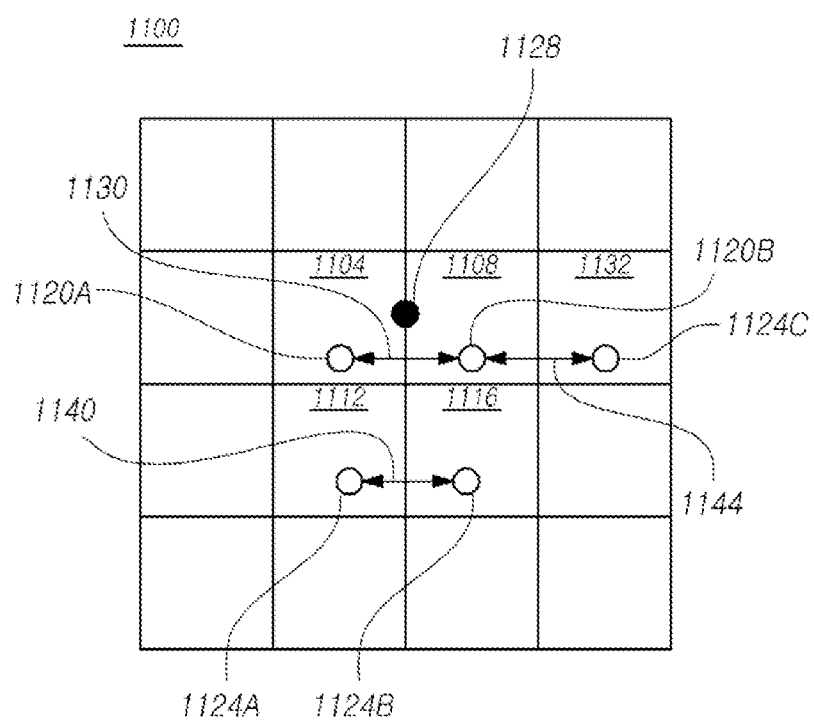
FIG. 11 illustrates a plan view of an array of pixels, within which are a first group of pixels with column spacers disposed between adjacent pixels and a second group of pixels that do not include column spacers, in an embodiment.

FIG. 11 illustrates a plan view of an array of pixels 1100. In this array are pixels 1104, 1108, 1112, 1116, and 1132. Also shown are contact holes 1120A, 1120B, 1124A, 1124B, and 1124C, and column spacer 1128. Lateral distances between the contact holes are indicated by arrows 1130, 1140, and 1144.

Within the array of pixels 1100 are two groups of pixels. The first group of pixels are adjacent pixels having a column spacer disposed at a boundary between the adjacent pixels. This first group of pixels within the array 1100 is illustrated by adjacent pixels 1104 and 1108, which are shown as having a column spacer 1128 disposed at the boundary therebetween. Pixels of the second group are those that do not include a column spacer at a boundary between adjacent pixels and are illustrated in the array 1100 as pixels 1132, 1112, 1116.

A first distance between contact holes of pixels in the first group (i.e., those adjacent pixels having a contact spacer at the boundary between the adjacent pixels) is greater than a second distance between contact holes of adjacent pixels lacking a contact spacer at the boundary between the adjacent pixels. As described above, this helps prevent placement of a contact spacer in a contact hole which would cause a defect in the display. As shown in FIG. 11, this first distance 1130 is between contact holes 1120A and 1120B between adjacent pixels of the first group 1104 and 1108. This first distance is greater than a second distance, which is indicated by arrow 1140, between contact holes 1124A and 1124B of pixels in the second group. The distance indicated by arrow 1130 is also greater than the distance between contact holes 1120B and 1124C.

The first distance indicated by arrow 1130 is determined according to the embodiments described above such as those illustrated by equations 1, 2, and 3.

Figure 12:
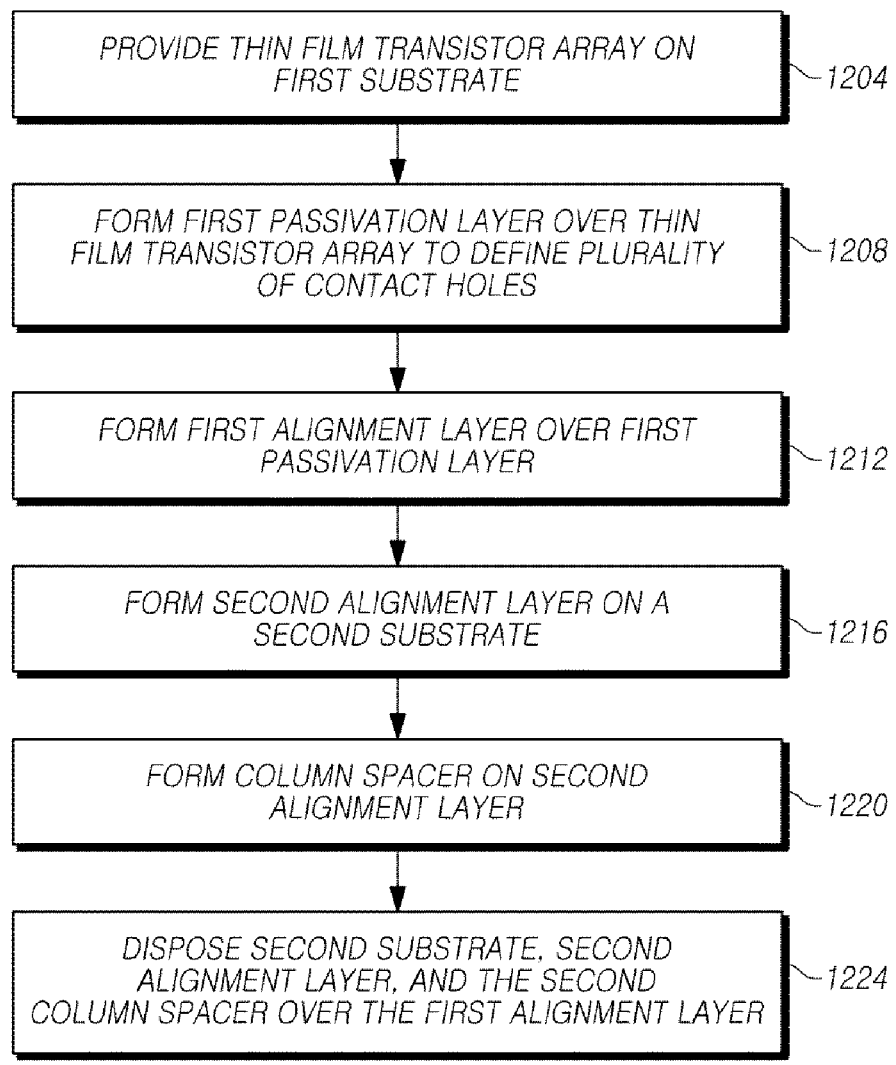
FIG. 12 illustrates an example method of fabricating a liquid crystal display device, in an embodiment.

FIG. 12 illustrates an example method 1200 of fabricating a liquid crystal display device according to the present disclosure in an embodiment. A thin film transistor array is provided 1204 on a first substrate. A first passivation layer is formed 1208 over the thin film transistor array. The first passivation layer defines a plurality of contact holes. Each contact hole exposes a portion of a corresponding drain electrode of a plurality of thin film transistors of the thin film transistor array. A first alignment layer is formed 1212 over the first passivation layer. A second alignment layer is formed 1216 on a second substrate. Column spacers are formed 1220 on the second alignment layer. In some embodiments, column spacers have a height that is equal to a distance between the first alignment layer and the second alignment layer when the liquid crystal device fabrication is complete, but in other embodiments the column spacers have a height that is less than this distance. The second substrate, second alignment layer and the second column spacers are disposed 1224 over the first alignment layer. A liquid crystal layer can be provided before or after the disposition 1224 of the second substrate, second alignment layer, and the second column spacers over the first alignment layer.

The pixel structure mentioned above according to the embodiment of the present invention may have various structures, and this will be described in detail with reference to drawings.

Although various embodiments have been described up to now with reference to the accompanying drawings, the present invention is not limited to thereto.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. A term ordinarily used like that defined by a dictionary shall be construed that it has a meaning equal to that in the context of a related description, and shall not be construed in an ideal or excessively formal meaning unless it is clearly defined in the present specification.

Although the embodiments of the present invention have been described for illustrative purposes, those skilled in the art will appreciate that various modifications, additions and substitutions are possible, without departing from the scope and spirit of the invention. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A liquid crystal display device pixel comprising:
   a first alignment layer disposed over a first substrate;
   a second alignment layer disposed below a second substrate;
   a passivation layer disposed below the first alignment layer over the first substrate, the passivation layer defining a contact hole, the contact hole exposing a portion of a drain electrode of a thin film transistor;
   a first column spacer disposed between the first alignment layer and the second alignment layer, the first column spacer having a first end proximate the first alignment layer and a second end proximate the second alignment layer,
   wherein a minimum lateral distance between the first end of the first column spacer and the contact hole is a sum of a predetermined design value plus an alignment margin.

2. The liquid crystal display device pixel of claim 1, wherein the alignment margin is measured from an outer edge of the first end of the first column spacer to an outer edge of the contact hole, and wherein the alignment margin is equal to or greater than a minimum alignment margin and equal to or less than a lateral distance between a data line and a pixel electrode of the liquid crystal display.

3. The liquid crystal display device pixel of claim 1, wherein the minimum lateral distance is the sum of the predetermined design value plus the alignment margin and further comprises an added value of a radius of the first end of the first column spacer, the minimum lateral distance measured from a center of the first end of the first column spacer to an outer edge of the contact hole.

4. The liquid crystal display device pixel of claim 1, wherein the minimum lateral distance is the sum of the predetermined design value plus the alignment margin and further comprises an added value of a difference between a radius of the first end of the first column spacer and a radius of a first end of a second column spacer, the first end of the second column spacer proximate to the first alignment layer.

5. A method of fabricating a liquid crystal display device, comprising:
   providing a thin film transistor array on a first substrate;
   forming a first passivation layer over the thin film transistor array, the first passivation layer defining a plurality of contact holes that each expose a portion of a corresponding drain electrode of a plurality of thin film transistors of the thin film transistor array;
   forming a first alignment layer over the first passivation layer;
   forming a second alignment layer on a second substrate;
   forming a column spacer on the second alignment layer; and
   disposing the second substrate, the second alignment layer and the column spacer over the first alignment layer, and wherein:
   the column spacer has a first end proximate the first alignment layer and a second end proximate the second alignment layer; and
   the first end of the column spacer is separated from the contact hole by a minimum lateral distance that is a sum of a predetermined design value plus an alignment margin.

6. The method of claim 5, wherein the alignment margin is measured from an outer edge of the first end of the column spacer to an outer edge of the contact hole, and wherein the alignment margin is equal to or greater than a minimum alignment margin and equal to or less than a lateral distance between a data line and a pixel electrode of the liquid crystal display.

7. The method of claim 5, wherein the minimum lateral distance between the first end of the column spacer and the contact hole is measured from a center of the first end of the column spacer to an outer edge of the contact hole.

8. The method of claim 7, wherein the minimum lateral distance is a sum of the predetermined design value plus the alignment margin plus a first radius of the first end of the column spacer.

9. The method of claim 7, wherein the minimum lateral distance is a sum of the predetermined design value plus the alignment margin plus a difference between a second radius of the second end of the column spacer and the first radius of the first end of the column spacer.

10. A liquid crystal display device comprising:
    an array of pixels, each pixel including a passivation layer defining a contact hole;
    a plurality of column spacers disposed only within a first group of pixels of the array of pixels at a plurality of boundaries between adjacent pixels of the first group,
    wherein a first distance between a contact hole of a first pixel of the first group and a contact hole of an adjacent second pixel of the first group is greater than a second distance between a contact hole of a first pixel of the second group of pixels and a contact hole of an adjacent second pixel of a second group of pixels.

11. The liquid crystal display device of claim 10, further comprising a minimum lateral distance between an end of a column spacer disposed between the first pixel of the first group and the adjacent second pixel of the first group, the minimum lateral distance a sum of a predetermined design value plus an alignment margin.

12. The liquid crystal display device of claim 11, wherein the alignment margin is measured from an outer edge of the end of the column spacer to each of an outer edge of the contact hole of the first pixel of the first group of pixels and to an outer edge of the contact hole of the second pixel of the second group of pixels, the alignment margin is equal to or greater than a minimum alignment margin and equal to or less than a lateral distance between a data line and a pixel electrode of each of the first pixel of the first group of pixels and the adjacent second pixel of the second group of pixels.

13. The liquid crystal display device of claim 11, wherein the minimum lateral distance is the sum of the predetermined design value plus the alignment margin and further comprises an added value of a radius of the end of the column spacer.

* * * * *